United States Patent
Richardson et al.

(10) Patent No.: US 8,805,371 B2
(45) Date of Patent: Aug. 12, 2014

(54) IDENTIFYING HAND-OVER TARGETS IN LIGHTLY COORDINATED NETWORKS

(75) Inventors: Andrew Richardson, Cambridge (GB); Jindong Hou, Cottenham (GB)

(73) Assignee: Airvana LP, Chelmsford, MA (US)

(*) Notice: Subject to any disclaimer, the term of this patent is extended or adjusted under 35 U.S.C. 154(b) by 432 days.

(21) Appl. No.: 12/405,641

(22) Filed: Mar. 17, 2009

(65) Prior Publication Data

US 2010/0242103 A1 Sep. 23, 2010

(51) Int. Cl.
*H04W 4/00* (2009.01)
*H04W 36/00* (2009.01)
*H04B 7/216* (2006.01)
*H04B 7/212* (2006.01)
*H04W 48/10* (2009.01)
*H04W 48/20* (2009.01)
*H04W 48/16* (2009.01)
*H04W 48/18* (2009.01)
*H04W 72/04* (2009.01)
*H04W 24/10* (2009.01)
*H04W 28/06* (2009.01)
*H04W 36/08* (2009.01)
*H04W 84/04* (2009.01)

(52) U.S. Cl.
CPC ............ *H04W 48/10* (2013.01); *H04W 48/16* (2013.01); *H04W 48/20* (2013.01); *H04W 48/18* (2013.01); *H04W 72/042* (2013.01); *H04W 24/10* (2013.01); *H04W 28/065* (2013.01); *H04W 36/08* (2013.01); *H04W 84/045* (2013.01)

USPC ......... 455/436; 455/435.1; 370/329; 370/328; 370/335; 370/338; 370/342; 370/331; 370/347

(58) Field of Classification Search
CPC ..... H04W 48/10; H04W 48/16; H04W 48/18; H04W 48/20; H04W 72/042; H04W 24/10; H04W 36/08; H04W 28/065; H04W 84/045
USPC ................................................. 455/436–444
See application file for complete search history.

(56) References Cited

U.S. PATENT DOCUMENTS 5,677,919 A * 10/1997 Antia ........................... 714/784
6,711,144 B1   3/2004 Kim et al.

(Continued)

FOREIGN PATENT DOCUMENTS

GB       2452688       3/2009
WO   WO 2008/066582 A1 * 6/2008 ............... H04Q 7/38

OTHER PUBLICATIONS

Proposal for CPCH Status Monitoring; Source: Philips (TSGR1#7bis(99)e78; TSG-RAN Working Group 1 meeting No. 7bis, Oct. 4-Oct. 5, 1999.*

(Continued)

*Primary Examiner* — Dwayne Bost
*Assistant Examiner* — Nalini Mummalaneni
(74) *Attorney, Agent, or Firm* — Fish & Richardson P.C.

(57) ABSTRACT

In general, a method performed on a portable access terminal operating in an active mode includes detecting a presence of a personal base station. An encoded identification message transmitted from the personal base station is received, and the encoded identification message includes a unique identifier associated with the personal base station. The encoded identification message is decoded to extract the unique identifier, and the unique identifier is transmitted to a source network entity.

26 Claims, 6 Drawing Sheets

(56) References Cited

U.S. PATENT DOCUMENTS

| | | |
|---|---|---|
| 6,731,618 B1 | 5/2004 | Chung et al. |
| 6,741,862 B2 | 5/2004 | Chung et al. |
| 6,781,999 B2 | 8/2004 | Eyuboglu et al. |
| 6,936,540 B2 * | 8/2005 | Andreas ................ 438/690 |
| 7,170,871 B2 | 1/2007 | Eyuboglu et al. |
| 7,200,391 B2 | 4/2007 | Chung et al. |
| 7,242,958 B2 | 7/2007 | Chung et al. |
| 7,277,446 B1 | 10/2007 | Abi-Nassif et al. |
| 7,299,278 B2 | 11/2007 | Ch'ng |
| 2002/0196749 A1 | 12/2002 | Eyuboglu et al. |
| 2003/0100311 A1 | 5/2003 | Chung et al. |
| 2003/0103476 A1 * | 6/2003 | Choi et al. ................ 370/329 |
| 2005/0213555 A1 | 9/2005 | Eyuboglu et al. |
| 2005/0243749 A1 | 11/2005 | Mehrabanzad et al. |
| 2005/0245279 A1 | 11/2005 | Mehrabanzad et al. |
| 2005/0286468 A1 * | 12/2005 | Agin et al. ................ 370/331 |
| 2006/0067422 A1 | 3/2006 | Chung |
| 2006/0067451 A1 | 3/2006 | Pollman et al. |
| 2006/0126509 A1 | 6/2006 | Abi-Nassif et al. |
| 2006/0159045 A1 | 7/2006 | Ananthaiyer et al. |
| 2006/0240782 A1 | 10/2006 | Pollman et al. |
| 2006/0291420 A1 | 12/2006 | Ng |
| 2006/0294241 A1 | 12/2006 | Cherian et al. |
| 2007/0026884 A1 | 2/2007 | Rao |
| 2007/0058628 A1 | 3/2007 | Rao et al. |
| 2007/0077948 A1 | 4/2007 | Sharma et al. |
| 2007/0097916 A1 | 5/2007 | Eyuboglu et al. |
| 2007/0115896 A1 | 5/2007 | To et al. |
| 2007/0140172 A1 | 6/2007 | Garg et al. |
| 2007/0140184 A1 | 6/2007 | Garg et al. |
| 2007/0140185 A1 | 6/2007 | Garg et al. |
| 2007/0140218 A1 | 6/2007 | Nair et al. |
| 2007/0155329 A1 | 7/2007 | Mehrabanzad et al. |
| 2007/0220573 A1 | 9/2007 | Chiussi et al. |
| 2007/0230419 A1 | 10/2007 | Raman et al. |
| 2007/0238442 A1 | 10/2007 | Mate et al. |
| 2007/0238476 A1 | 10/2007 | Raman et al. |
| 2007/0242648 A1 | 10/2007 | Garg et al. |
| 2007/0248042 A1 | 10/2007 | Harikumar et al. |
| 2008/0003988 A1 | 1/2008 | Richardson |
| 2008/0013488 A1 | 1/2008 | Garg et al. |
| 2008/0062925 A1 | 3/2008 | Mate et al. |
| 2008/0065752 A1 | 3/2008 | Ch'ng et al. |
| 2008/0069020 A1 | 3/2008 | Richardson |
| 2008/0069028 A1 | 3/2008 | Richardson |
| 2008/0076398 A1 | 3/2008 | Mate et al. |
| 2008/0076419 A1 * | 3/2008 | Khetawat et al. ......... 455/435.1 |
| 2008/0117842 A1 | 5/2008 | Rao |
| 2008/0119172 A1 | 5/2008 | Rao et al. |
| 2008/0120417 A1 | 5/2008 | Harikumar et al. |
| 2008/0139203 A1 | 6/2008 | Ng et al. |
| 2008/0146232 A1 | 6/2008 | Knisely |
| 2008/0151843 A1 | 6/2008 | Valmikam et al. |
| 2008/0159236 A1 | 7/2008 | Ch'ng et al. |
| 2008/0162924 A1 | 7/2008 | Chinitz et al. |
| 2008/0162926 A1 | 7/2008 | Xiong et al. |
| 2008/0253550 A1 | 10/2008 | Ch'ng et al. |
| 2008/0254792 A1 | 10/2008 | Ch'ng |
| 2008/0305792 A1 * | 12/2008 | Khetawat et al. ......... 455/435.1 |
| 2008/0305793 A1 * | 12/2008 | Gallagher et al. ......... 455/435.1 |
| 2009/0034440 A1 | 2/2009 | Samar et al. |
| 2009/0059848 A1 * | 3/2009 | Khetawat et al. ............ 370/328 |
| 2009/0061879 A9 * | 3/2009 | Gallagher et al. ............ 455/439 |
| 2009/0082020 A1 | 3/2009 | Ch'ng et al. |
| 2009/0088155 A1 | 4/2009 | Kim |
| 2010/0242103 A1 | 9/2010 | Richardson et al. |

OTHER PUBLICATIONS

Proposal for CPCH Status Monitoring; Source: Philips (TSGR1#7bis(99)e78; TSG-RAN Working Group 1 meeting No. 7bis, Oct. 4-Oct. 5, 1999 Provided in previous office action.*

3rd Generation Partnership Project 2 "3GPP2", "cdma2000 High Rate Packet Data Interface Specification", C.S0024, version 2, Oct. 27, 2000 (441 pages).

3rd Generation Partnership Project 2 "3GPP2", "cdma2000 High Rate Packet Data Interface Specification", C.S0024-A, version 2, Jul. 2005 (1227 pages).

3rd Generation Partnership Project 2 "3GPP2", "cdma2000 High Rate Packet Data Interface Specification", C.S0024-B, version 1, Apr. 2006 (1623 pages).

3rd Generation Partnership Project 2 "3GPP2", "cdma2000 High Rate Packet Data Interface Specification", C.S0024-B, version 2, Mar. 2007 (1627 pages).

3rd Generation Partnership Project 2 "3GPP2", "cdma2000 High Rate Packet Data Interface Specification", C.S0024, version 4, Oct. 25, 2002 (548 pages).

* cited by examiner

IDENTIFYING HAND-OVER TARGETS IN LIGHTLY COORDINATED NETWORKS

TECHNICAL FIELD

This patent application relates generally to identifying hand-over targets.

BACKGROUND

Cellular wireless communications systems, for example, are designed to serve multiple wireless-enabled devices distributed over a large geographic area by dividing the area into regions called "cells" or "cell areas". At or near the center of each cell area, a network-side access device (e.g., an access point or base station) is located to serve client devices located in the cell area and commonly referred to as "access terminals" ("ATs") or user equipment ("UEs"). Examples of ATs or UEs include wireless-enabled devices such as cellular telephones, laptops, personal digital assistants (PDAs), and/or other user equipment (e.g., mobile devices). An access terminal generally establishes a call, also referred to as a "communication session," with an access point to communicate with other entities (e.g., servers) in the network.

Mobile wireless cellular networks (e.g. UMTS/WCDMA) have been implemented and are in operation globally. However, the coverage of those 2G/3G macro networks is often poor which causes call disruption to customers at home and inside buildings. The home base station (sometimes referred to as Home NodeB ("HNB") or Femtocell Access Points "FAP") is a solution to the indoor coverage problem providing complementary indoor coverage to 2G/3G macro networks for service continuity; moreover, it also acts as a new service platform to enable mobile wireless broadband applications and home entertainment.

A common problem in a lightly coordinated cellular network (e.g., a macro-Femto mixed network) is that cells do not have sufficient and accurate knowledge about their neighbors. So, ambiguity is created in (target) cell identification for a UE in active mode which can disrupt activities such as hand-over towards FAPs. For example, such identification ambiguity may cause inaccuracy and excessive failures in hand-over attempts for a UE in active mode.

Various proposals have been made concerning methods for hand-overs into Femto networks. The proposals include a method for identifying the hand-over target by using the Primary Scrambling Code (PSC), and a method for identifying the hand-over target by identifying an umbrella macro cell. However, many of these proposals are based on shared and ambiguous target identifiers and consequently still cause excessive hand-over failure and unwanted signaling. For instance, in some conventional systems, hundreds of simultaneous hand-ins are attempted in hopes of getting correctly identifying the desired target cell. This approach unnecessarily wastes network resources.

SUMMARY

In general, in some aspects, a method performed on a portable access terminal operating in an active mode includes detecting a presence of a personal base station. An encoded identification message transmitted from the personal base station is received, and the encoded identification message includes a unique identifier associated with the personal base station. The encoded identification message is decoded to extract the unique identifier, and the unique identifier is transmitted to a source network entity.

Aspects can include one or more of the following features. The portable access terminal enters a compressed mode. Detecting includes detecting the presence of the personal base station by detecting a scrambling code of the personal base station. Detecting includes comparing a signal quality of the personal base station with a pre-determined threshold. The access terminal receives the encoded identification message over a channel status indicator channel (CSICH) from the personal base station. The portable access terminal transmits the unique identifier to the source network entity in a measurement report message (MRM) or a radio resource control message (RRC). The network is a circuit-switched network or a packet-switched network. Decoding includes partially decoding the encoded identification message and storing a partial result. The access terminal combines one or more partial results to form a full result.

In general, in some aspects, a method includes detecting, by a portable access terminal, a presence of a personal base station. A portable access terminal receives an encoded identification message transmitted from the personal base station, and the encoded identification message includes a unique identifier associated with the personal base station. The encoded identification message is decoded on the portable access terminal to extract the unique identifier. The unique identifier is transmitted to a source network entity, and the source network entity determines whether to hand-over a session to the personal base station based on one or more predetermined factors.

Aspects can include one or more of the following features. The source network entity transmits a relocation message to a target network entity, the relocation message being populated with the unique identifier. The source network entity verifies a validity of the unique identifier before populating the relocation message with the unique identifier.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

In wireless communication networks generally, geographic areas served by access points, also referred to as "service areas," may vary in size, may include smaller service areas, and/or may be located within larger service areas. Larger geographic areas that include one or more smaller service areas are referred to as "macrocell areas," and an access point that serves a macrocell area is referred to as a "macrocell" or "macro base station." Within a macrocell area, one or more access points may be located to serve smaller geographic areas, referred to as "femtocell areas." An access point that serves a femtocell area is referred to as a "femtocell access point" (FAP). A macrocell, for example, may provide coverage to an area of a few blocks, while a femtocell access point may provide coverage to an area covering the interior or vicinity of a vehicle, or spanning a floor of a building, a house, or an office space.

Global System for Mobile communications/Wideband Code Division Multiple Access (GSM/WCDMA) wireless communication networks (e.g., 2G/3G macro networks) have been implemented and are in operation globally. However, one motivation for providing "femtocell access points" in such 2G/3G macro networks is that the coverage of those macro networks is often poor which may cause, e.g., service disruption (e.g., a dropped telephone call) to users of User Equipment (UEs) at home and inside buildings. Femtocell access points, also known as, e.g., "home" base stations, private access points, or simply "femtocells", provide complementary indoor coverage to 2G/3G macro networks for service continuity. Femtocell access point (FAP) implementations may also serve as a new service platform to enable mobile wireless broadband applications and home entertainment.

A private access point may include, for example, a femtocell access point or a picocell access point. A private access point may be installed anywhere, for example, a vehicle, a home, an office, a public space, or a restaurant. For ease of description, private access points will be described hereinafter as femtocell access points or FAPs. For communications between user equipments and access points generally, a call established between an access point and user equipment may be transferred to another access point in a process referred to as a "hand-over". From the point of view of a particular access point, there are two types of hand-overs: a "hand-out" moves an in-progress call out to a neighboring access point (allowing the access point to free up its resources) and a "hand-in" occurs when a neighboring access point transfers an in-progress call into the access point (the access point needs to allocate resources to service the call).

A hand-over may be performed for a variety of different reasons. Typically, a hand-over occurs when user equipment moves into a different coverage area. For example, a call that has been established with a macrocell may be transferred to a neighboring macrocell when the user equipment moves outside of the service area covered by the macrocell. A hand-over may also occur when the capacity for connecting new calls to a particular macrocell is reached. In this scenario, the macrocell may transfer an existing call (or a new call) to another macrocell with overlapping coverage. Hand-overs between macrocells and femtocells may occur for similar/other reasons. A femtocell hand-in may occur when a UE determines that a neighboring femtocell can provide faster and/or more robust communications with the user equipment than can the current macrocell. For example, the user equipment could be located in closer geographic proximity to the femtocell or there may be fewer obstructions in the communication path between the femtocell and the user equipment. Femtocell hand-in may occur whenever a femtocell signal is detected by the user equipment because it is operator policy to prefer femtocell usage over macrocell.

To facilitate a hand-over, a UE identifies nearby macrocells or femtocells from information provided by the access point which is currently servicing the call. The information, collectively, is referred to as a "neighbor list" and includes scrambling codes assigned to neighboring macrocells and femtocells. The scrambling codes are used in WCDMA to separate transmissions from different access points sharing the same channel frequencies. A neighbor list may also include channel frequencies assigned to neighboring macrocells and femtocells.

In many hand-over processes, for example, a UE selects a scrambling code of a nearby access point from the neighbor list received from its current access point. The user equipment uses the scrambling code to decode a pilot signal that is continuously transmitted by the nearby access point in order to determine the quality of the communication channel between itself and that access point. For example, the user equipment can determine the signal-to-noise ratio, and the bandwidth of the communication channel. If the user equipment determines that the communication channel is of sufficient quality, it establishes communication with the nearby access point. Otherwise, the user equipment selects the scrambling code of a different access point from the neighbor list, tests the associated pilot signal, and repeats the process until a suitable access point is determined.

Figure 1:
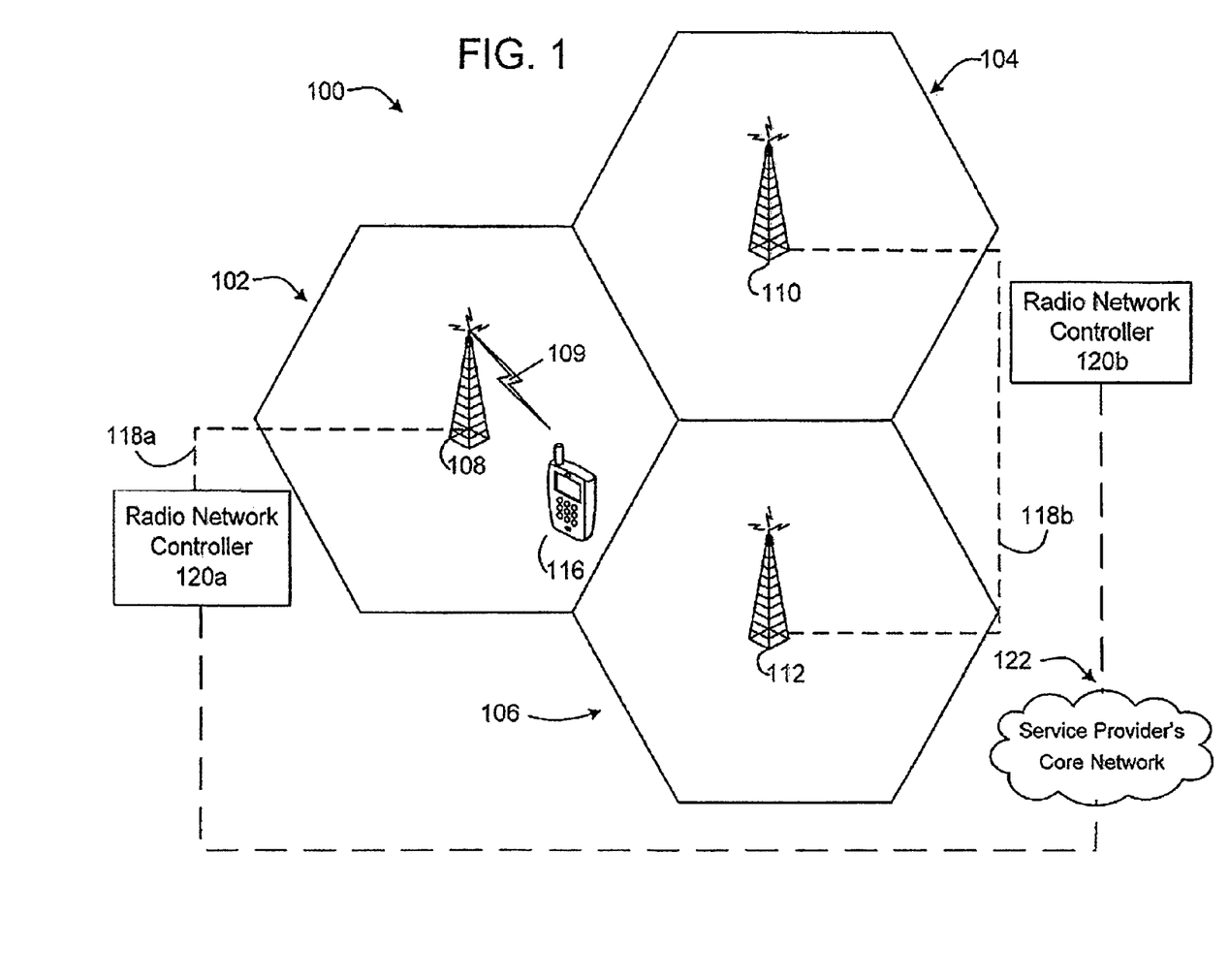
FIG. 1 is a diagram of a radio access network (RAN).

Referring to FIG. 1, a radio access network (RAN) 100 includes multiple macro access points or "macrocells" 108, 110, and 112 located in macrocell areas 102, 104, and 106, respectively. The macrocell areas 102, 104, and 106 can cover one or more femtocell access points (FAPs). The macrocells 108, 110, and 112 are each configured to communicate with a UE over an airlink. For example, macrocell 108 communicates with user equipment (UE) 116 over an airlink 109. Macrocells 108, 110, and 112 are connected over a backhaul connection (e.g., backhaul connection 118a or 118b) to a radio network controller (RNC) which in turn communicates with the service provider's core network 122, e.g., via RNC 120a or 120b, which may be one or more physical devices at different locations.

The RAN 100 is configured to support various mobile wireless access technologies, examples of which include Universal Mobile Telecommunications System (UMTS), Long Term Evolution (LTE) and Code Division Multiple Access (CDMA) 2000. The 1xEV-DO protocol has been standardized by the Telecommunication Industry Association (TIA) as TIA/EIA/IS-856, "CDMA2000 High Rate Packet Data Air Interface Specification," 3GPP2 C.S0024-0, Version 4.0, Oct. 25, 2002, which is incorporated herein by reference. Revision A is also this specification has been published as TIA/EIA/IS-856A, "CDMA2000 High Rate Packet Data Air Interface Specification," 3GPP2 C.S0024-A, Version 2.0, July 2005. Revision A is also incorporated herein by reference. Revision B to this specification has been published as TIA/EIA/IS-856-B, 3GPP2 C.S0024-B and is also incorporated herein by reference. Other wireless communication standards may also be used. Although this description uses terminology from the 3GPP's UMTS standards, the same concepts are applicable to other wireless communication standards, including CDMA 1x EV-DO, CDMA2000, WIMAX, WIBRO, WIFI, and the like.

The following sections of the 3GPP Standard are hereby incorporated by reference in their entirety:

3GPP Technical Specification 25.211 version 5.6.0 Release 5, 2004-09, Physical channels and mapping of transport channels onto physical channels (FDD)

3GPP Technical Specification 25.331 version 8.3.0 Release 8, 2008-07, Universal Mobile Telecommunications System (UMTS); Radio Resource Control (RRC); Protocol specification;

3GPP Technical Specification 25.304 version 7.6.0 Release 7, 2008-07, Universal Mobile Telecommunications System (UMTS); User Equipment (UE) procedures in idle mode and procedures for cell reselection in connected mode;

3GPP Technical Specification 25.133 version 8.3.0 Release 8, 2008-06, Universal Mobile Telecommunications System (UMTS); Requirements for support of radio resource management (FDD);

3GPP Technical Specification 24.008 version 7.9.0 Release 7, 2007-10, Digital cellular telecommunications system (Phase 2+); Universal Mobile Telecommunications System (UMTS); Mobile radio interface Layer 3 specification; Core network protocols; Stage 3; and 3GPP Technical Specification 23.122 version 7.9.0 Release 7, 2007-06, Digital cellular telecommunications system (Phase 2+); Universal Mobile Telecommunications System (UMTS); Non-Access-Stratus (NAS) functions related to Mobile Station (MS) in idle mode.

Figure 2:
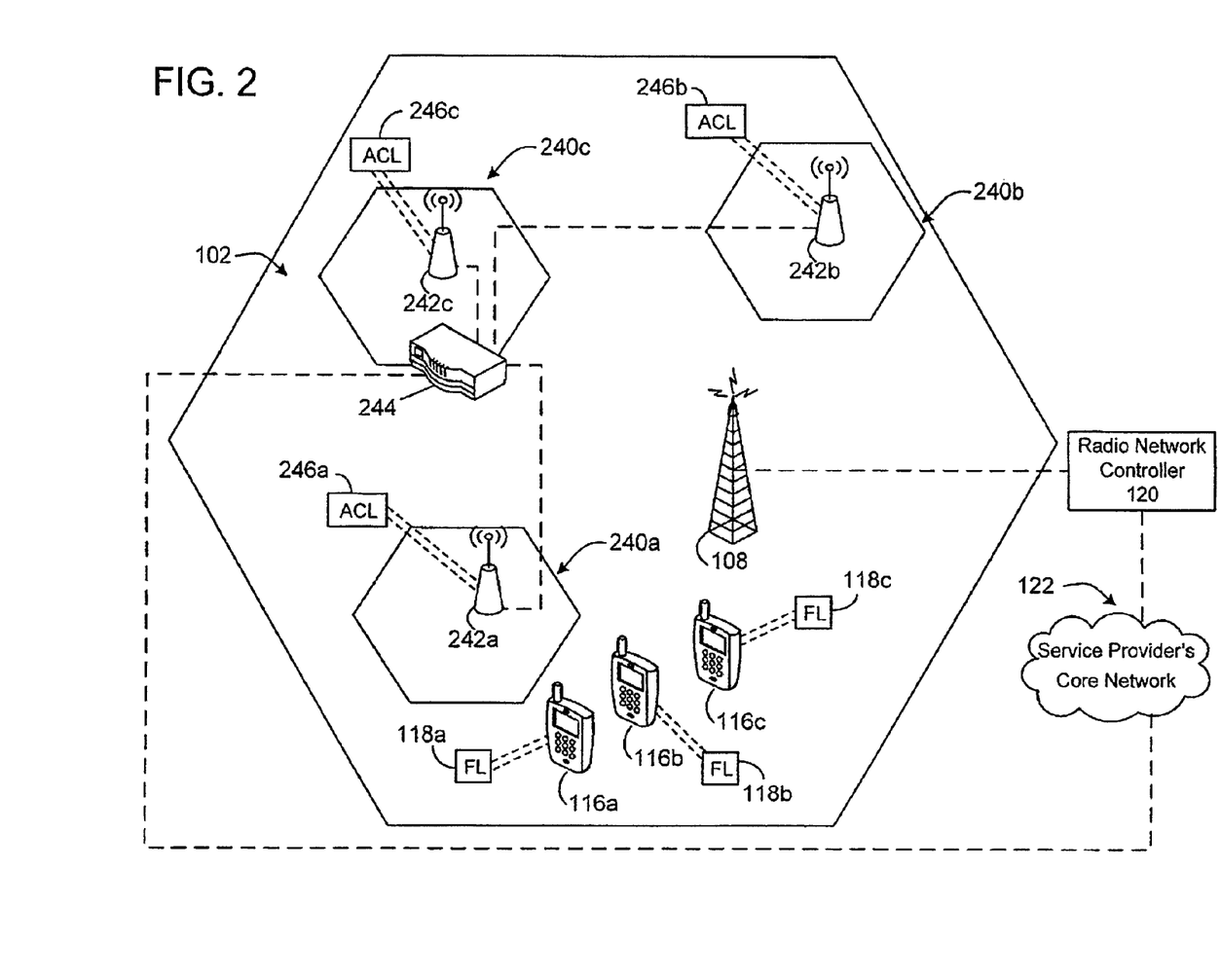
FIG. 2 is a diagram of a femtocell deployment within a macrocell area of the RAN of FIG. 1.

FIG. 2, is a diagram showing a femtocell deployment in the macrocell service area 102 of the RAN 100 of FIG. 1. The service area 102 of macrocell 108 includes femtocell areas 240a, 240b, and 240c served by femtocell access points (FAPs) 242a, 242b, and 242c, respectively. Hereinafter, the femtocell access points 242a, 242b, and 242c are referred to as "FAPs 242a, 242b, and 242c." Although, only three FAPs are shown in FIG. 2, in practice a macrocell area can include many more FAPs. For example, a macrocell area could include hundreds, thousands, or hundreds of thousands of FAPs.

A femtocell server 244 (or "network gateway"—see FIG. 3) is in communication with one or more of the FAPs 242a-c. The femtocell server 244 maintains active associations between user equipments such as user equipments (UEs) 116a, 116b, and 116c and the FAPs 242a-c so that a hand-in request from the macrocell 108 (or other components of the mobile core network) can be directed to the correct FAP. One or more of the FAPs 242a-c and the femtocell server 244 may be combined as a single device. In early deployment, the femtocell server 244 may present a similar, conventional system interface as that of RNC 120 to the existing core network infrastructure 122. References to the core network 122 may, in some cases, be a shorthand for a reference to the femtocell server 244, and in some implementations, certain functions of the core network 122 may be included in the femtocell server 244 and vice versa. For example, when reference is made to an FAP accessing stored information from the core network 122, all or part of the information might be stored on the core network 122 and/or the femtocell server 244.

Each of the FAPs 242a-c is generally configured to continuously transmit or broadcast a main pilot signal. The main pilot for an FAP is decoded with a main scrambling code assigned to that particular FAP. The terms "main scrambling code" and "main pilot" may also be referred to as "operating/primary scrambling code" and "operating/primary pilot," respectively. The FAPs' main scrambling codes may be assigned with maximum geographic dispersal in order to minimize radio interference probability (given that they may be reused within a macrocell area in a dense deployment). The main scrambling codes assigned to the FAPs 242a-c may be stored in the neighbor list of the macrocell 108.

Femtocell access point systems typically perform some type of closed access control. Closed access control can mean the access to each femtocell access point is limited in some fashion (e.g., not every user equipment may "camp" on the femtocell and/or utilize the services of the femtocell). For example, an owner of an FAP may wish to control which user equipments are allowed to camp on and register with the core network 122 via the FAP to use normal service (e.g., non-emergency service).

User equipments may be "authorized" or "not authorized" ("unauthorized") to camp on and/or use services of an FAP. Each FAP of the FAPs 242a-c may include an authorization list, or "access control list," which may be stored in memory on the FAP (see, e.g., access control lists (ACLs) 246a, 246b, 246c stored on respective FAPs 242a, 242b, 242c in FIG. 2). The access control list for a particular FAP includes identities of UEs that are authorized on that FAP. Access control lists may be updated periodically by an administrator or operator of the core network (e.g., the core network 122). UEs that are not identified on the access control list of a particular FAP are not authorized on that FAP. A particular UE may be authorized on one FAP and unauthorized on another FAP. From the perspective of an FAP, a UE is either an authorized user equipment (AUE) or an unauthorized user equipment (UUE). From the perspective of a UE, an FAP is either an authorized FAP (e.g., a "home" FAP that the UE is authorized on), or an unauthorized FAP (e.g., a "foreign" FAP that the UE is not authorized on).

A home FAP may be located in a user's home, in an office building, or in some other public or private location. Likewise, a "foreign" FAP may be located in close physical proximity to a user's home FAP but still be foreign from the perspective of the UE. Just as an FAP may identify more than one authorized UE in its access control list, a UE may be authorized on more than one FAP (and thus may have more than one authorized FAP or home FAP). For ease of description, a home FAP for a UE will be referred to as though it is the only home FAP for the user equipment.

Since an access control list of an FAP may change from time to time, a particular UE may change from being an authorized UE (AUE) at one point in time to being an unauthorized UE (UUE) for that FAP. Similarly, from the perspective of the "changing" UE, what was once an authorized FAP (e.g., a "home" FAP) when the UE was an AUE for that FAP, becomes an unauthorized FAP (e.g., a "foreign" FAP") when the UE becomes a UUE for that same FAP.

In portions of the following description, the UE 116a is referred to as being an authorized UE on the FAP 242a, and the FAP 242a is referred to as being a home FAP for, or from the perspective of, the UE 116a. At the same time, the UE 116a is referred to as being an unauthorized UE with respect to the FAP 242b, and the FAP 242b is referred to as being a foreign FAP for, or from the perspective of, the UE 116a. In analogous fashion, the UE 116b is referred to as being an authorized UE on the FAP 242b and an unauthorized UE on the FAP 242a. References to UEs 116a-c as authorized UEs and/or unauthorized UEs and FAPs 242a-c as home FAPs and/or foreign FAPs are merely examples. Thus, in some examples, the FAPs 242a, 242b, and 242c may be home FAPs for one or more UEs and may simultaneously be foreign FAPs for one or more other UEs. The UEs 116a-c may be authorized UEs for one or more FAPs and may simultaneously be unauthorized UEs for one or more other FAPs.

Examples of UE identifiers that may be used in an access control list on a particular FAP may include the International Mobile Subscriber Identity (IMSI) of the UE. While the UE may also use a temporary identifier such as a Temporary Mobile Subscriber Identity (TMSI) in initial communications with an FAP, access control lists may generally include the unique IMSI of the UE rather than the TMSI.

In a wireless network such as a UMTS network, each access point is assigned an access point identifier such as a Location Area Identifier. Location Area Identifiers are explained in more detail in 3GPP Technical Specification 23.003, section 4.4.4.6. The Location Area Identifier (LAI) of the access point is broadcast to UEs. When camping on an access point, the UE issues a Location Area Update Request message that contains the LAI assigned to that access point. That Location Area Update Request message is forwarded by the access point to the core network and the core network returns a message to the UE that allows that UE to camp on the access point to use normal service (e.g., non-emergency service) or that rejects the UE's Location Area Update Request to disable normal service (unless the UE is trying to make an emergency call from the FAP). Once camped on an access point with a particular LAI, the UE can move into the coverage area of another access point with the same LAI without issuing a new Location Area Update Request. The UE issues a new Location Area Update Request message when the UE moves into the coverage area of an access point with a different LAI. The UE may also issue the Location Area Update Request periodically to inform an access point that the UE is still in the vicinity of the access point.

An LAI is an example of an access point identifier. In some examples, wireless networks that use other air interface standards may use an access point identifier other than an LAI in access control.

When a UE moves into the coverage area of an FAP, the UE will generally issue a Location Area Update Request message containing the LAI assigned to that FAP. Thus, even a UE that is unauthorized on a particular FAP but that is in range of, or in the coverage area of, the FAP will generally attempt to camp on the FAP and do Location Area registration with the core network (e.g., core network 122) using the Location Area Update Request message. In order to support a form of closed access control, Location Area Update Request messages from unauthorized UEs should be rejected to prevent the unauthorized UEs from camping on the FAP to use normal service.

Considering a UMTS Macro-Femto co-network as an example, such a lack of sufficient information and the resulting identification ambiguity could be due to a number of reasons. As a first example, a UE in active mode only reports a target cell's Primary Scrambling Code (PSC) in the Measurement Report Message (MRM), as this is reused by multiple FAPs and cannot uniquely identify a target. As a result, the PSC is mapped or translated into a "nominal" cell id and enclosed in relocation messages and consequently the network cannot uniquely identify a target cell. As a second example, a UE with WCDMA continuous Tx/Rx nature has to enter Compressed Mode (CM) to be able to do inter-frequency or inter-RAT measurements. However, the maximum Transmission Gap (TG) in the CM is about 9.3 ms (e.g., 14 slots), which is far less than 20 ms System Information Block (e.g. SIB3) transmission block. This makes it difficult for the UE to decode SIB3 in the CM to obtain the other target cell identity/identifier.

Generally the Compressed Mode in UMTS/WCDMA is a special sub-mode of UE active/connected mode, which allows a UE to have some short intervals during the continuous transmission/reception operation on the current frequency to intermittently switch to other frequencies to search and measure neighbor cells.

Figure 3:
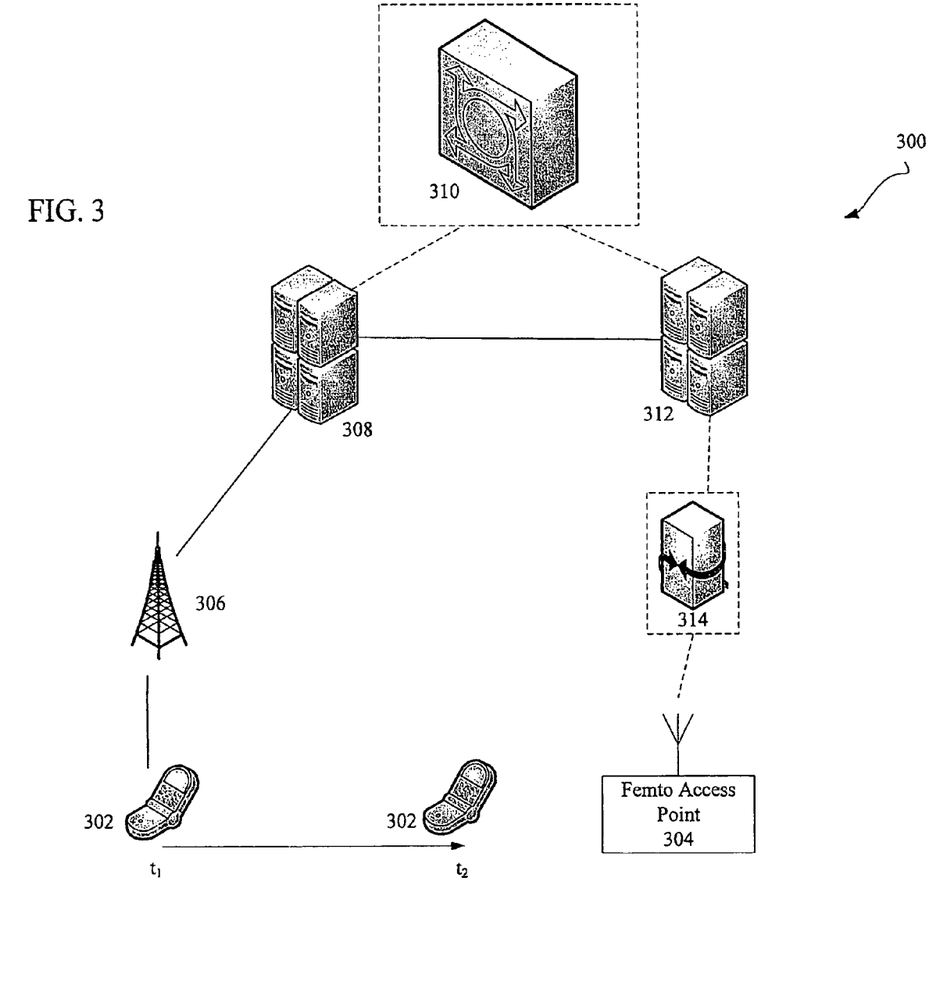
FIG. 3 illustrates an access terminal within a network including one or more femto access points.

In general, the techniques described herein enable handovers that have increased accuracy and that are relatively free of identification ambiguity in a cellular network. FIG. 3 illustrates an overview of a system 300 that facilitates hand-ins in a network using cells such as Femto cells. A system 300 provides mechanisms that can be used to identify a target hand-in cell for a UE that is in an active mode.

An exemplary hand-in performed within system 300 will now be described with reference to FIG. 3. At time $t_1$, access terminal 302 is communicating through radio node (RN) 306 to another user through source radio network controller (RNC) 308, and optionally through MSC 310. In this example, the access terminal 302 moves away from RN 306 in the direction of the FAP 304, which may be installed in a user's home, office, or other location. Certain parameters received on UE 302 cause the UE 302 to begin measuring characteristics of adjacent cells. For example, UE 302 performs measurements such as cell search, signal strength measurement, and evaluation/ranking. The measurements can be periodic, or can be based on other factors, such as whether the macro cell is experiencing interference. As part of the measurements, UE 302 attempts to detect the presence of other cells. Due to WCDMA's continuous Tx/Rx nature, the UE 302 must enter compressed mode to measure inter-frequency or inter-RAT cells (in CMDA and 3GPP systems). UE 302 intermittently stops transmitting for a pre-defined period (e.g., approximately 9.3 ms) so that it can measure cells on different frequencies. UE 302 may still measure cells on the same frequencies, but the UE 302 would not need to enter compressed mode in that case. UE 302 may perform these measurements while it is supporting an active session.

While UE 302 is making measurements, it might detect the primary scrambling code of FAP 304 within its range (e.g., at time $t_2$), or may detect the presence of FAP 304 in some other manner. If a number of pre-determined factors are satisfied, the UE 302 begins to decode a channel containing unique identifying information for the FAP 304 (the home node B identification channel ("HIDCH"), described in greater detail below). For instance, whenever the UE 302 detects the presence of an FAP 304, it begins to measure and compare the FAP's signal quality with a pre-defined threshold. If the detected FAP's quality is better than the threshold (or, optionally, if it remains better for a period of a pre-defined hysteresis), the UE 302 will begin to decode the HIDCH channel of the FAP 304. If no FAP is detected, or if an FAP's signal is worse than a pre-defined threshold, the UE 302 does not need to decode the HIDCH. In one embodiment, the purpose of the quality threshold is to ensure that the UE decodes the HIDCH only when the FAP quality is acceptable. In this way, UE 302 can avoid unwanted decoding and preserve the UE's battery life.

Once the pre-defined factors are met, UE 302 decodes the FAP 304 identity. The UE 302 reports measurements back to the network controller (e.g., source RNC 308) as part of normal operation. For example, UE 302 transmits measurement report messages (MRM) and/or radio resource control messages (RRC). In some examples, the UE 302 uses MRM, which can be encoded to report many different things; however, in conventional systems, MRM message do not report an identity of the target cell itself (other than the scrambling code). The MRM may be modified to include the identity of the FAP 304, so that the source RNC 308 can identity of the FAP to the target entity (e.g. Femto gateway).

Source RNC 308 may contain software that decides whether the macro cell signal strength has gotten so weak that the session should be handed over to a new cell, and also determines whether the detected FAP 304 has a signal quality that is high enough to be a target for the hand-over attempt. This decision can be based on a macro hand-over process, which is based on, for example, the ratio of the chip energy to the noise energy. If this ratio drops below a certain threshold, the source RNC 308 may decide to hand-in the session—in this case to the FAP 304.

Source RNC 308 transmits a message containing the information that uniquely identifies the target FAP 304 to either MSC 310 (which forwards the message to the target RNC 312 or generates and sends a new message containing the same target identification information to the target RNC 312), or directly to the target RNC 312, depending on the architecture of the network 300. The message containing the target identifying information is then transmitted from Target RNC 312 to the gateway 314. The gateway 314 then examines the target identification information pointing to FAP 304 and decides whether it needs to make a hand-in attempt to the FAP 304.

It should be noted that in some examples, target RNC 312 can perform the functions of the gateway 314. That is, a single device might perform the functions of target RNC 312 and gateway 314. The gateway 314 could also be directly connected to the MSC 310. Additionally, the network 300 could also contain more than one MSC (e.g., a source MSC and a target MSC).

Using UMTS/WCDMA systems as an example, such hand-over/relocation messages may contain one or more of the following messages: "RELOCATION REQUIRED", "RELOCATION REQUEST" and "PHYSICAL CHANNEL RECONFIGURATION". The target identification information, such as the 28-bit "Cell Identity" unique within one PLMN, can be added to these hand-over/relocation messages; and it can be populated into either an existing Information Element (IE) or a new-defined IE in these hand-over/relocation messages. The existing IEs can include IE of "Source To Target Transparent Container" in "RELOCATION REQUIRED/REQUEST" messages and the IE of "Downlink information for each radio link" in "PHYSICAL CHANNEL RECONFIGURATION" message.

Assuming gateway 314 authorizes a hand-in attempt, gateway 314 begins to communicate with FAP 304. After allocating proper resources for the hand-in session, FAP 304 begins to respond with a hand-over confirmation/acknowledge message to begin the synchronization process with UE 302. Messages sent from FAP 304 will go back through the network to the source RNC 308. Once the hand-over confirmation message is returned from the target entity, the hand-over-controlling source entity, (e.g., the source RNC) transmits the hand-over command message to UE 302 (e.g., a physical channel reconfiguration message), which causes UE 302 to connect to the new cell associated with FAP 304. The source RNC may need to populate the same target identification information in the hand-over command message sent to AT 302 when the enhanced relocation/hand-over requesting messages previously sent to the target entity also contains the target identification information.

In some examples, changes to the measurement report messages and procedures report the target identity information or equivalent to the FAP and then to any or all of the RNC/FAP-GW and CN. At least one new field/Information Element (IE), that is, the "target identity" described above is defined and added to the conventional measurement report messages. Such target identity information is associated with each cell with HIDCH capacity, and may be a subset of neighbor cell information in the measurement report messages. An AT may populate this IE when it can and has successfully decoded the HIDCH channel of any neighbor cell (e.g., FAP 304) to obtain the target identity information. Once the new IE of "target identity" is populated, the UE will send the enhanced measurement report messages to relevant network entities responsible for receiving the measurement report messages and performing proper actions (e.g., hand-over initiation and execution) based on the measurement reports. The responsible network nodes include, but are not limited to, the FAP, the RNC the FAP-GW and the CN nodes.

The decoding technique implemented by the UE 302 can also include the feature of "soft-combining." For example, in decoding received information, the information obtained with each decoding attempt can be preserved and incorporated with the retransmitted copies of a codeword. That is, the UE 304 may temporarily store any erroneous data, and may then combine erroneous data and retransmitted data to reduce a probability of error occurrence. The correct data obtained from the partially successful decoding attempt can be stored and combined with partial correct data obtained during subsequent decoding attempts.

In some examples, enhancements are made to relocation messages to be sent for the initiation and execution of hand-over procedures. At least one new field/Information Element, namely, "target identity," is defined and added to the conventional hand-over/relocation messages. The decision to populate the new IE of "Target Identity" in the relocation messages is up to those network entities responsible for receiving the measurement report messages and controlling the cellular network hand-over initiation procedures as mentioned above. Thus, those entities in charge of measurement reports and hand-over procedures may need to populate the IE of "target identity" in the enhanced hand-over/relocation messages, for example, only when the measurement report messages they received from ATs contain valid target identity information. Once the new IE of "target identity" is populated, the enhanced relocation message is sent from hand-over source RNC/FAP-GW to the following entities: (1) the same or different target RNC directly; (2) the same or different target FAP-GW directly; or (3) different target RNC/FAP-GW via CN (e.g. MSC).

Thus, a new channel (HIDCH) broadcasts specific target identity information in a way that facilitates a UE in an active mode decoding and obtaining the specific target identity which can be used to accurately identify the target hand-in FAP. AT measurement control procedure is also enhanced to allow the collection of the target identity information provided by AT 304. Enhancements to the measurement report messages and procedures relate to a method for reporting the obtained target identity information (or equivalent quantity) to any, either or all of the following network entities: FAP, RNC/FAP-GW (FAP Gateway) and CN.

Furthermore, enhancements are made to the relocation message transmitted over network interfaces (e.g., either Iu or Iur for UMTS/WCDMA system) such that target cell identity or equivalent from source to target hand-in cell is included. In doing so, the hand-over accuracy can be improved. Finally, target RNC/FAP-GW is enhanced to enable it to interpret the indicated target identity in the relocation messages and thus identify the target FAP cell with minimum ambiguity.

While the network architectures discussed herein have focused on the circuit-switched domain, similar techniques could be implemented in a packet-switched domain, or any other topology. For example, an SGSN might replace the MSC described in FIG. 3.

Figure 4:
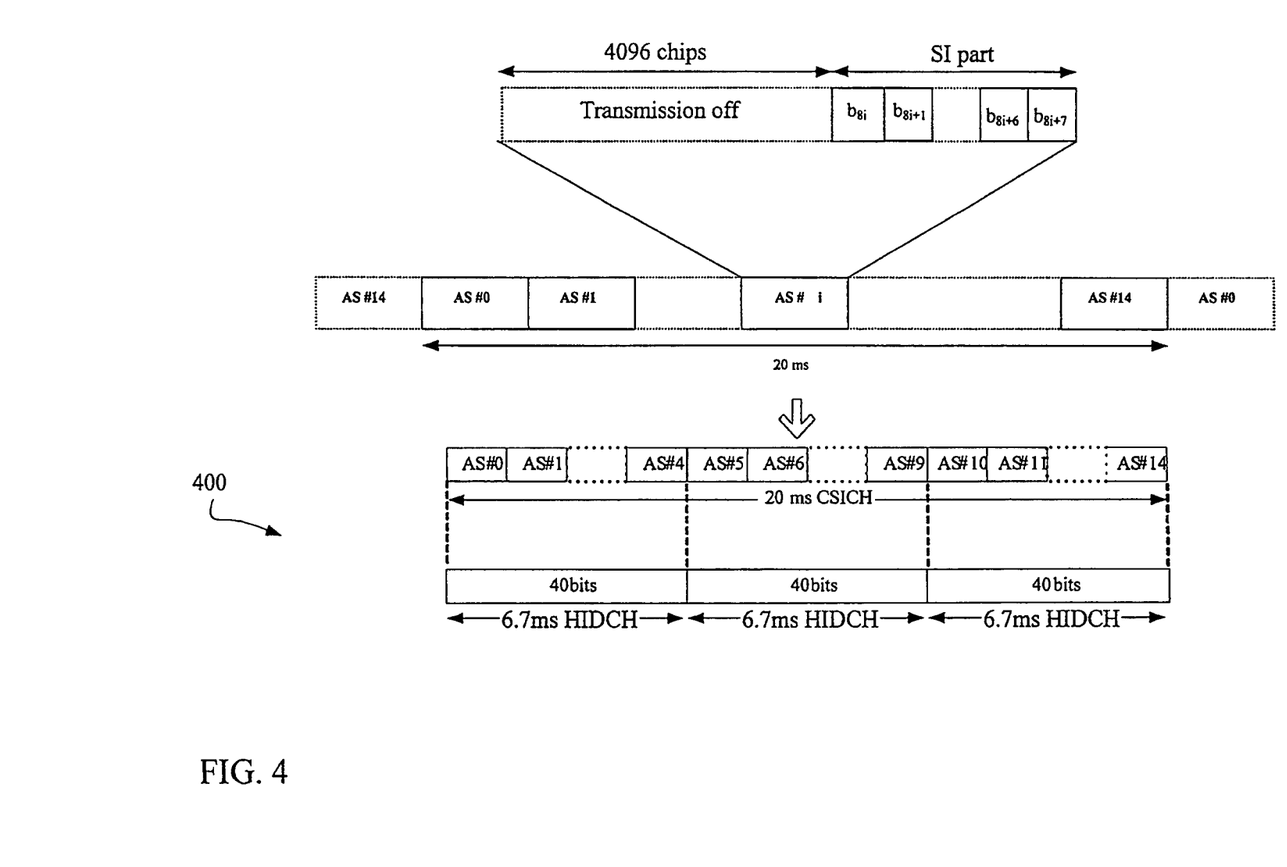
FIG. 4 illustrates an exemplary definition for an HIDCH channel that supports target identification.

An exemplary definition 400 for the new channel HIDCH that supports the accurate target identification and hand-in activities is shown in the example of FIG. 4. The new-defined HIDCH channel can be any of the following channels: (1) a reuse of the channel status indicator channel ("CSICH"); (2) a reuse of a different existing channel; or (3) a completely new channel that meets the requirements defined in the following basic structure. The basic structure can include an orthogonal spreading code, and a short message duration (e.g., less than 9 ms and with a repetition such that a UE can locate the message within a single compressed mode gap independent of the timeframe.).

As for the specific target identity for the purpose of accurate hand-in, it can be conveyed and broadcast by HIDCH and can be any of the following options: (1) a reuse of existing cell identity (e.g. 28-bits "Cell Identity", 28 bits Global Cell Identity (GCI) composed of 12-bits RNC-ID, and 16-bits "Cell Id" defined in 3GPP), (2) a new cell identity; (3) an existing FAP group identity (e.g. CSG ID); or (4) a new-defined FAP group identity. All of above identities could be either unique or general to a group that is unique in macro coverage or in network.

The HIDCH channel can include a number of features. For example, the HIDCH may be compatible with the capabilities of an active AT. For instance, if used in UMTS, the HIDCH may be compatible with compressed mode characteristics (e.g. maximum transmission gap length, gap repetition times and intervals, etc), and may support AT measurement abilities once the UE moves to Cell_FACH state temporarily Furthermore, the HIDCH may have proper frame length and may apply any appropriate schemes (e.g., coding, spreading, scrambling, or modulation) on the target identity to ensure that it can be readily decoded and read by a UE in active mode (e.g. in compressed mode).

According to the exemplary definition 400 of the proposed HIDCH illustrated in FIG. 4, HIDCH reuses the void "SI" portion of the CSICH channel to carry the target identity (e.g. 28 bits "Cell Identity") that facilitates accurate hand-in. Each SI has 8 bits. So, in some examples, 5 SIs can be grouped into one new-defined HIDCH frame (40 bits). As a result, each CISCH frame can allow 3 repeated HIDCH frames and each HIDCH frame is 6.7 ms. The specific target identity (e.g. 28 bits "Cell Identity") can be encoded into each 40 bits HIDCH frame. Some exemplary encoding schemes could include Reed Solomon, Golay, Cyclic Block Codes (BCH), Fire Code and Punctured ½ rate Convolutional. Deciding which specific encoding scheme(s) to be used for the HIDCH is a matter of design choice.

In some examples, a UE in compressed mode decodes the hand-in target identity. For this purpose, the Transmission Gap Length (TGL) of the CM could be configured to 14 slots (e.g., 9.3 ms). Since 9.3 ms TGL is substantially longer than 6.7 ms HIDCH defined in this example design, the target identity can be readily decoded by the UE in one transmission gap or a limited number of gaps in compressed mode. In some instances the UE may not be able to decode the HIDCH in a single reception cycle due to e.g. too low signal strength. In this case, the UE can collect samples from multiple detected HIDCH channels and perform a soft combination of the samples to improve its ability to detect the channel.

The HIDCH channel can be used for both inter-frequency and intra-frequency system for the purpose of hand-over target identification and the like. For the case of inter-frequency UMTS/WCDMA system, FAPs equipped with HIDCH are located in a different frequency carrier from that of macro; thus a UE has to enter Compressed Mode first to be able to detect and decode the HIDCH channel of an inter-frequency neighbor FAPs to obtain the unambiguous target identity. Whereas for the case of intra-frequency system, FAPs equipped with HIDCH are located in the same frequency carrier as that of macro; thus a UE can detect and decode the HIDCH channel of an intra-frequency neighbor FAP at the same time as it performs other intra-frequency activities.

Figure 5A:
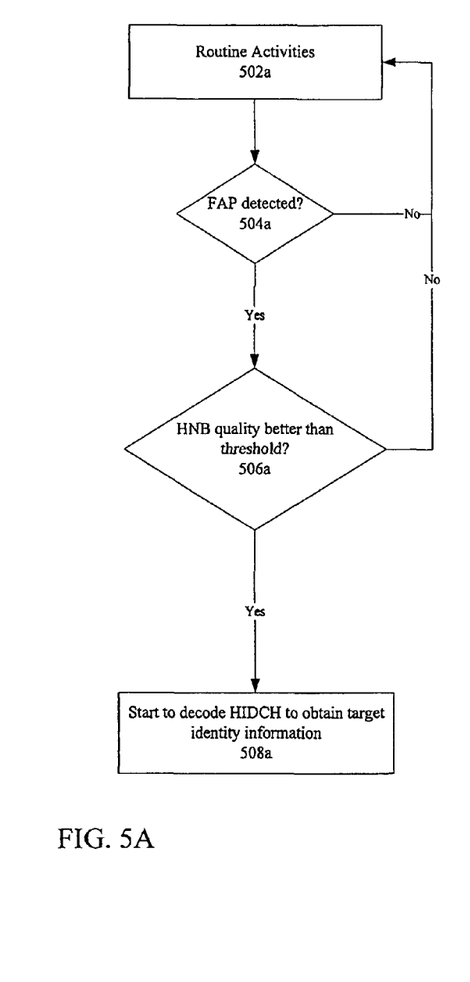
FIGS. 5A and 5B are flowcharts.

FIG. 5A shows an enhancement to the traditional measurement control procedure in the UE to allow the collection of the target identity information from the HIDCH defined above. Initially a UE in active mode performs (502a) routine measurement activities such as cell search, signal strength measurement and evaluation/ranking. Whenever the UE detects (504a) the existence of a nearby FAP, it begins to measure and compare the FAP' signal quality with a pre-defined threshold. If the detected FAP's quality is better than the threshold (506a) (optionally keeps being better constantly for a period of a pre-defined hysteresis), the UE will start to decode (508a) the HIDCH channel of the FAP. If no FAP is detected or if the FAP's signal does not exceed the threshold, the UE does not need to decode the HIDCH.

Figure 5B:
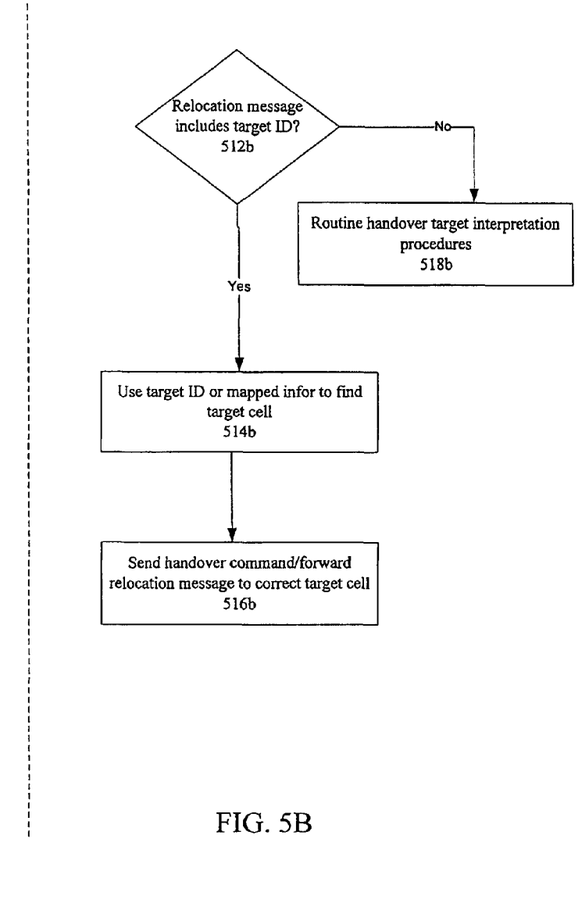

FIG. 5B demonstrates the changes and enhancements to relocation message interpretation and target identification procedures. Once the relocation message recipient (e.g. hand-over target RNC/FAP-GW) receives a relocation message, it checks (512b) whether the new IE of "target identity" is properly populated. If the new IE of "target identity is properly populated, the relocation message recipient (e.g., the hand-over target domain controller) uses (514b) the populated target identity information or its corresponding/mapped identity information (e.g. FAP ID, Cell Id, IP address, etc). This information can allow the recipient to uniquely identify the target cell for hand-over to find the correct hand-over target cell (e.g. FAP) without ambiguity, and then send (516b) hand-over commands or forward relocation messages to the identified hand-over target cell (e.g. FAP). If the new IE of "target identity is not properly populated, the recipient just performs (518b) routine relocation message interpretation logic, for example in UMTS, the IE "RNC ID" and "Cell Id" contained in the IE "Transparent Container" contained in the relocation messages are interpreted by target RNC/FAP-GW in order to identify the hand-over target cell.

Figure 6:
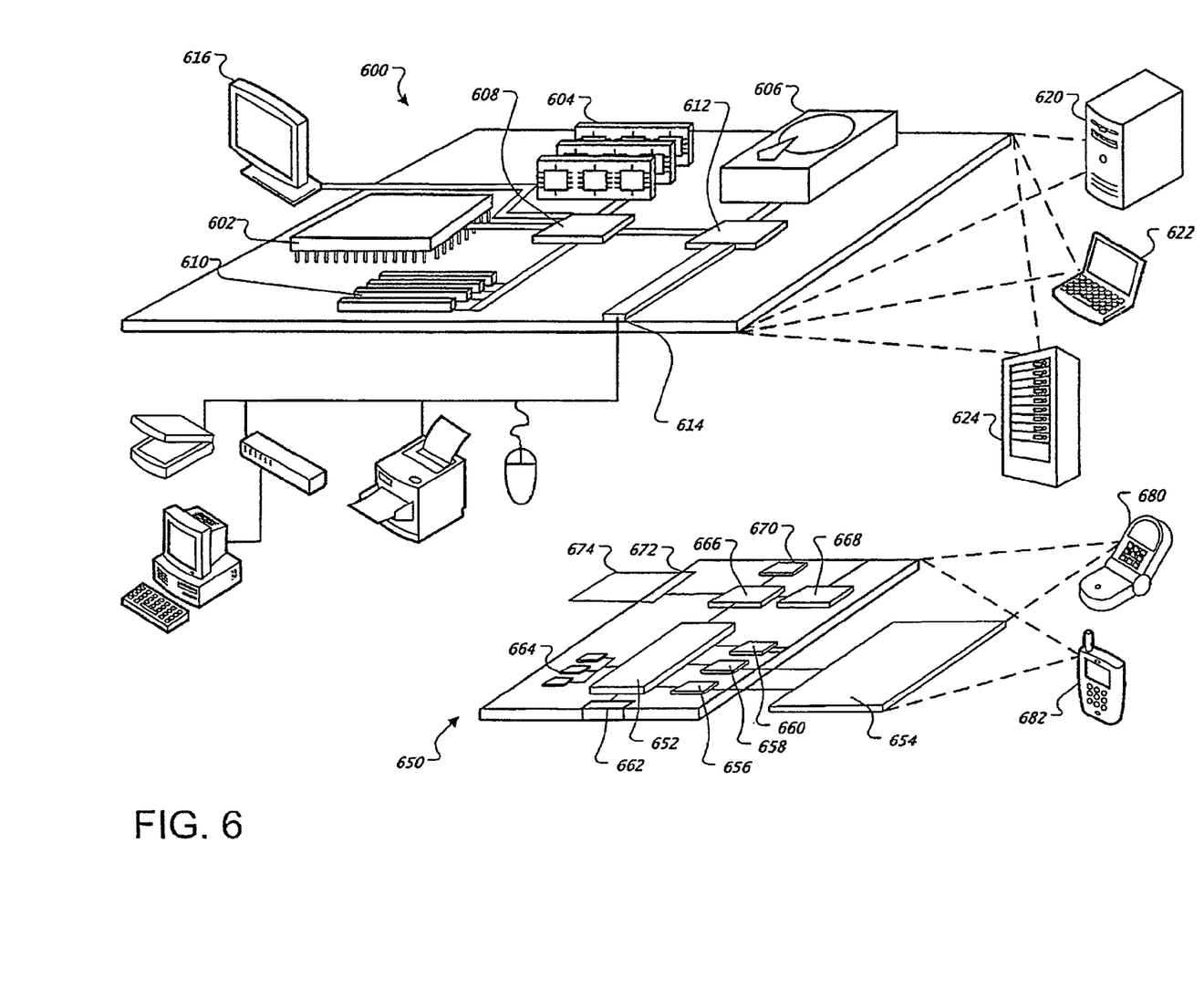
FIG. 6 is a block diagram of computing devices

FIG. 6 is a block diagram of computing devices 600, 650 that may be used to implement the individual devices and methods described in this document, either as a client or as a server or plurality of servers. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, "smartphones," and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a computer-readable medium. In one implementation, the memory 604 is a volatile memory unit or units. In another implementation, the memory 604 is a non-volatile memory unit or units. The storage device 606 is capable of providing mass storage for the computing device 600. In one implementation, the storage device 606 is a computer-readable medium. In various different implementations, the storage device 606 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer-or machine-readable medium, such as the memory 604, the storage device 606, or a memory on processor 602.

The high speed controller 608 manages bandwidth-intensive operations for the computing device 600, while the low speed controller 612 manages lower bandwidth-intensive operations. Such allocation of duties is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can process instructions for execution within the computing device 650, including instructions stored in the memory 664. The processor may also include separate analog and digital processors. The processor may provide, for example, for coordination of the other components of the device 650, such as control of user interfaces, applications run by device 650, and wireless communication by device 650. Processor 652 may communicate with a user through control interface 658 and display interface 656 coupled to a display 654. The display 654 may be, for example, a TFT LCD display or an OLED display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication (e.g., via a docking procedure) or for wireless communication (e.g., via Bluetooth or other such technologies).

The memory 664 stores information within the computing device 650. In one implementation, the memory 664 is a computer-readable medium. In one implementation, the memory 664 is a volatile memory unit or units. In another implementation, the memory 664 is a non-volatile memory unit or units. Expansion memory 674 may also be provided and connected to device 650 through expansion interface 672, which may include, for example, a SIMM card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, memory on processor 652, or a propagated signal. Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a BLUETOOTH WIFI, or other such transceiver (not shown). In addition, GPS receiver module 670 may provide additional wireless data to device 650, which may be used as appropriate by applications running on device 650.

Device 650 may also communication audibly using audio codec 660, which may receive spoken information from a user and convert it to usable digital information. Audio codex 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor. To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described herein can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope. For example, advantageous results may be achieved if the steps of the disclosed techniques were performed in a different sequence, if components in the disclosed systems were combined in a different manner, or if the components were replaced or supplemented by other components. The functions and processes (including algorithms) may be performed in hardware, software, or a combination thereof, and some implementations may be performed on modules or hardware not identical to those described. Accordingly, other implementations are within the scope of the following claims.

What is claimed is:

1. A method performed on a portable access terminal operating in an active mode, the method comprising:
   detecting a presence of a personal base station;
   receiving an encoded identification message transmitted from the personal base station over a channel status indicator channel, the encoded identification message comprising a unique identifier associated with the personal base station and the encoded identification message being configured to be detectable by the portable access terminal within a single compressed mode gap;
   decoding the encoded identification message to extract the unique identifier; and
   transmitting the unique identifier to a source network entity;
   wherein the encoded identification message is decoded from a plurality of eight bit status indicator portions of the channel status indicator channel;
   wherein the plurality of eight bit status indicator portions are grouped into a home node B identification channel frame.

2. The method of claim 1, wherein the portable access terminal enters a compressed mode.

3. The method of claim 1, wherein detecting comprises detecting the presence of the personal base station by detecting a scrambling code of the personal base station.

4. The method of claim 1, wherein detecting comprises comparing a signal quality of the personal base station with a pre-determined threshold.

5. The method of claim 1, wherein the portable access terminal transmits the unique identifier to the source network entity in a measurement report message (MRM) or a radio resource control message (RRC).

6. The method of claim 1, wherein the network is a circuit-switched network or a packet-switched network.

7. The method of claim 1, wherein decoding comprises partially decoding the encoded identification message and storing a partial result.

8. The method of claim 7, wherein the access terminal combines one or more partial results to form a full result.

9. A method comprising:
   detecting, by a portable access terminal, a presence of a personal base station;
   receiving, by a portable access terminal, an encoded identification message transmitted from the personal base station over a channel status indicator channel, the encoded identification message comprising a unique identifier associated with the personal base station and the encoded identification message being configured to be detectable by the portable access terminal within a single compressed mode gap;
   decoding the encoded identification message on the portable access terminal to extract the unique identifier; and
   transmitting the unique identifier to a source network entity, the source network entity determining whether to hand-over a session to the personal base station based on one or more predetermined factors;
   wherein the encoded identification message is decoded from a plurality of eight bit status indicator portions of the channel status indicator channel;
   wherein the plurality of eight bit status indicator portions are grouped into a home node B identification channel frame.

10. The method of claim 9, wherein the source network entity transmits a relocation message to a target network entity, the relocation message being populated with the unique identifier.

11. The method of claim 10, wherein the source network entity verifies a validity of the unique identifier before populating the relocation message with the unique identifier.

12. A system comprising:
   a personal base station;
   a source network entity; and a portable access terminal in an active mode, the portable access terminal to:

detect a presence of the personal base station receive an encoded identification message transmitted from the personal base station over a channel status indicator channel, the encoded identification message comprising a unique identifier associated with the personal base station and the encoded identification message being configured to be detectable by the portable access terminal within a single compressed mode gap;

decode the encoded identification message to extract the unique identifier; and     transmit the unique identifier to the source network entity;

wherein the encoded identification message is decoded from a plurality of eight bit status indicator portions of the channel status indicator channel;

wherein the plurality of eight bit status indicator portions are grouped into a home node B identification channel frame.

13. The system of claim 12, wherein the portable access terminal enters a compressed mode.

14. The system of claim 12, wherein the portable access terminal detects the presence of the personal base station by detecting a scrambling code of the personal base station.

15. The system of claim 12, wherein the portable access terminal transmits the unique identifier to the source network entity in a measurement report message (MRM) or a radio resource control message (RRC).

16. The system of claim 12, wherein the source network entity determines whether to hand-over a session to the personal base station based on one or more predetermined factors.

17. The system of claim 12, wherein the source network entity transmits a relocation message to a target network entity, the relocation message being populated with the unique identifier.

18. The system of claim 12, further comprising circuit-switched or packet-switched network architecture.

19. A non-transitory computer program product, tangibly embodied in a computer-readable medium, for executing instructions on a processor, the computer program product being operable to cause a portable access terminal operating in an active mode to:

detect a presence of a personal base station;

receive an encoded identification message transmitted from the personal base station over a channel status indicator channel, the encoded identification message comprising a unique identifier associated with the personal base station and the encoded identification message being configured to be detectable by the portable access terminal within a single compressed mode gap;

decode the encoded identification message to extract the unique identifier; and     transmit the unique identifier to a source network entity;

wherein the encoded identification message is decoded from a plurality of eight bit status indicator portions of the channel status indicator channel;

wherein the plurality of eight bit status indicator portions are grouped into a home node B identification channel frame.

20. The computer program product of claim 19, wherein the portable access terminal enters a compressed mode.

21. The computer program product of claim 19, wherein detecting further comprises detecting the presence of the personal base station by detecting a scrambling code of the personal base station.

22. The computer program product of claim 19, wherein the portable access terminal transmits the unique identifier to the source network entity in a measurement report message (MRM) or a radio resource control message (RRC).

23. The computer program product of claim 19, wherein the network is a circuit-switched network or a packet-switched network.

24. The computer program product of claim 19, wherein decoding comprises partially decoding the encoded identification message and storing a partial result.

25. The computer program product of claim 19, wherein the access terminal combines one or more partial results to form a full result.

26. The computer program product of claim 19, wherein the source network entity transmits a relocation message to a target network entity, the relocation message being populated with the unique identifier.

\* \* \* \* \*